United States Patent [19]

McMahon

[11] Patent Number: 5,054,270

[45] Date of Patent: Oct. 8, 1991

[54] BAG SUPPORT/SPREADER FOR VERTICAL FORM, FILL AND SEAL MACHINES

[75] Inventor: Michael J. McMahon, Palatine, Ill.

[73] Assignee: Zip-Pak Incorporated, Northbrook, Ill.

[21] Appl. No.: 493,618

[22] Filed: Mar. 15, 1990

[51] Int. Cl.⁵ .................. B65B 9/20; B65B 51/30; B65B 41/14; B65B 51/14

[52] U.S. Cl. .................. 53/552; 53/374.5; 53/389.3

[58] Field of Search .............. 53/551, 552, 554, 451, 53/526, 527, 373, 386, 389, 374.5, 389.3

[56] References Cited

U.S. PATENT DOCUMENTS

| | | | |
|---|---|---|---|
| 3,027,695 | 4/1962 | Leasure | 53/552 X |
| 3,052,074 | 9/1962 | Dreeben | 53/552 |
| 3,552,081 | 1/1971 | Leasure | 53/552 X |
| 3,738,080 | 6/1973 | Reil | 53/551 |
| 4,079,662 | 3/1978 | Puccetti et al. | 53/552 |
| 4,215,520 | 8/1980 | Heinzer et al. | 53/552 X |
| 4,378,666 | 4/1983 | Onishi | 53/551 X |
| 4,840,012 | 6/1989 | Boeckmann | 53/451 X |

Primary Examiner—Horace M. Culver
Attorney, Agent, or Firm—Hill, Van Santen, Steadman & Simpson

[57] ABSTRACT

In a form, fill and seal package or bag making machine having a vertical forming and filling tube and cross-sealing and pull down mechanism below the discharge end of the tube, a mechanism by which the filled bag is supportingly manipulated during cross-sealing to avoid bag contents weight induced stretch stress damage to the thermosealed top edge of the filled bag, and avoiding bag contents weight caused pleats and tucks in the bag body film, and redistributing the filled bag contents to avoid central sagging of the filled bag.

4 Claims, 2 Drawing Sheets

U.S. Patent
Oct. 8, 1991
5,054,270
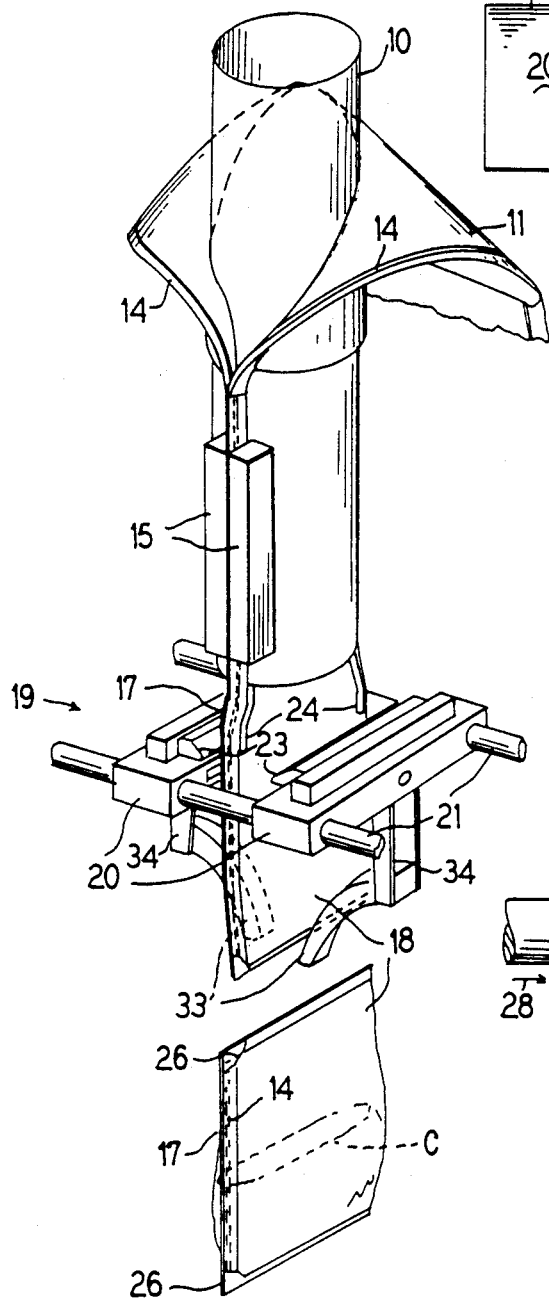
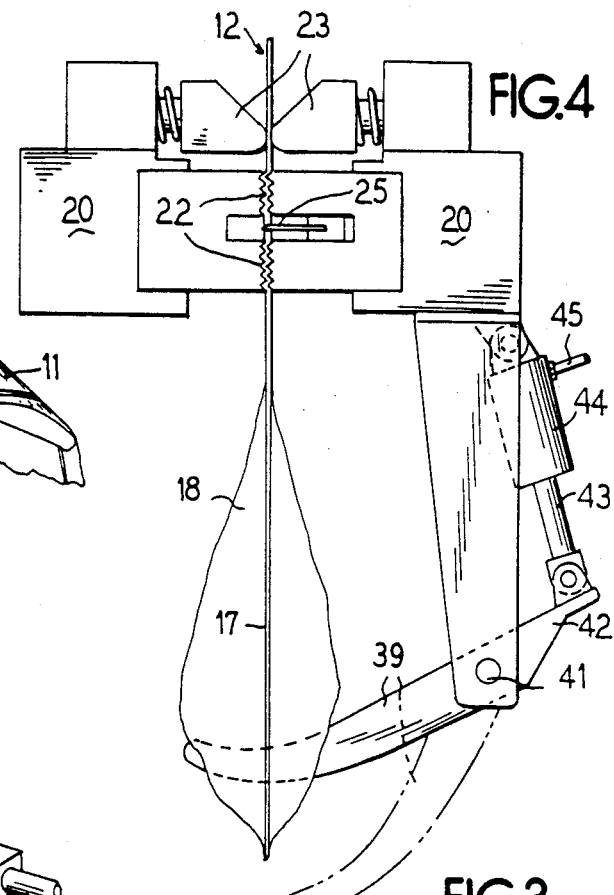
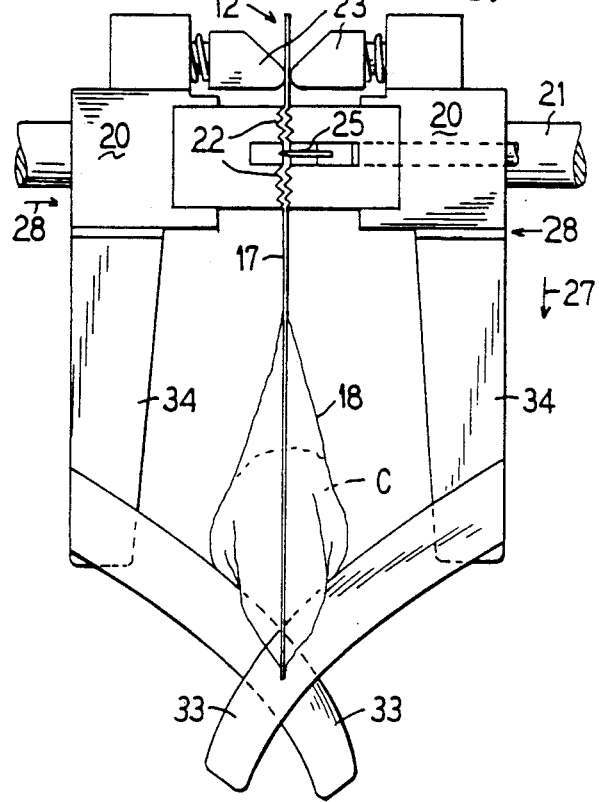

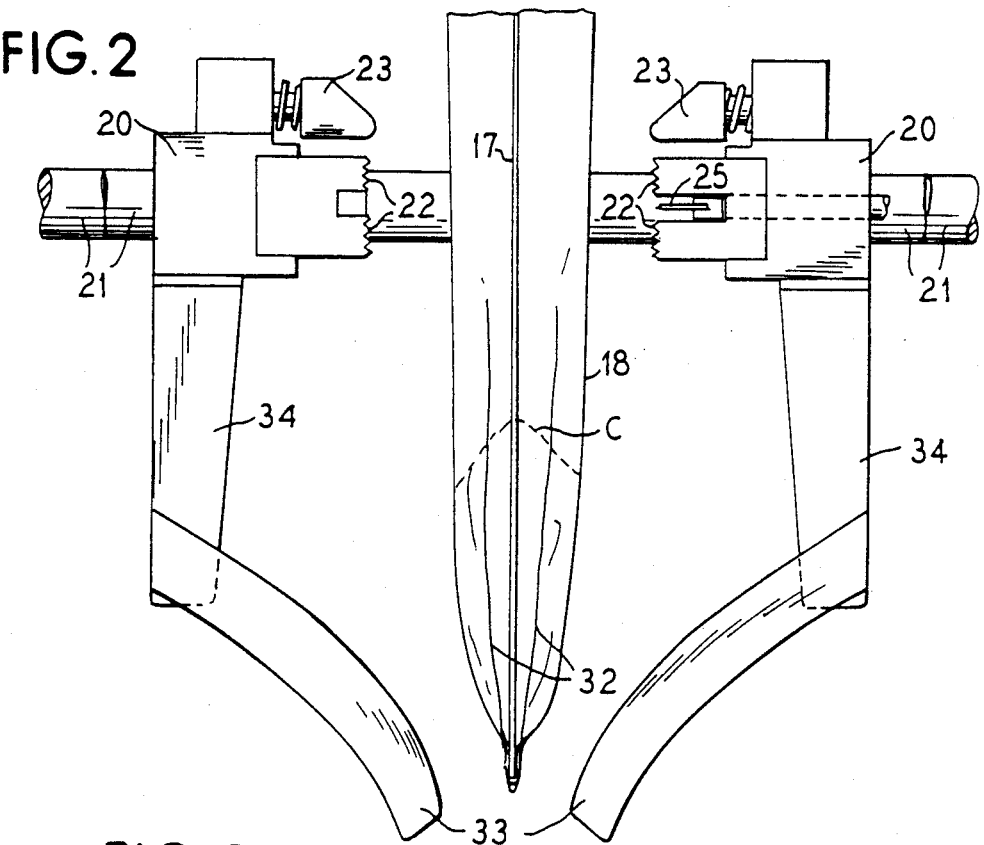
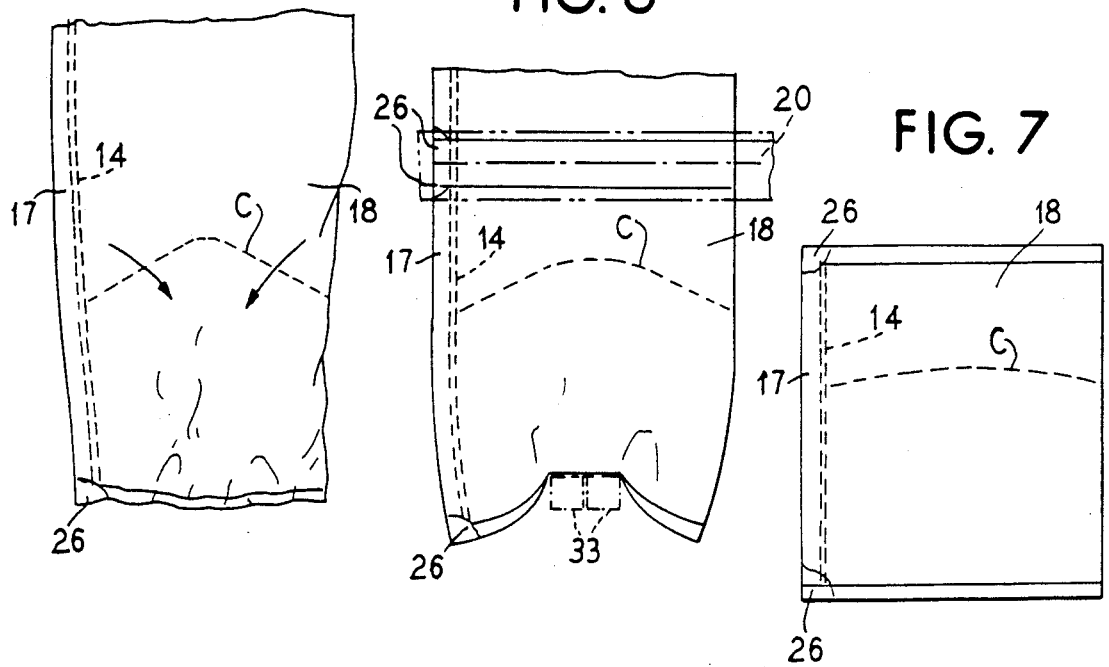

BAG SUPPORT/SPREADER FOR VERTICAL FORM, FILL AND SEAL MACHINES

BACKGROUND OF THE INVENTION

The present invention relates to the making of filled bags in vertical form, fill and seal machines, and is more particularly concerned with providing supportive manipulation for the filled bags for various purposes.

In the production of filled bags in a form, fill and seal machine, thermoplastic bag making film is tubularly shaped about a forming and filling tube and drawn downwardly by bag length sections by means of a thermo-cross-sealing mechanism. Such mechanism customarily comprises cooperative reciprocating jaws or bars which function to close below the discharge end of the forming and filling tube to seal the top edge of each bag after it is filled, while at the same time sealing the lower edge of the succeeding bag. Then, while still gripping the cross-seals, the closed bars pull the bags and the bag making material downwardly a bag length section and release the now sealed and filled bag which has been detached from the next succeeding bags by means associated with the sealing and pull-down mechanism. By way of example, U.S. Pat. No. 4,790,136 is referred to as showing a typical machine of the kind described. To any extent necessary, that patent is incorporated herein by reference to lessen the need for a more detailed description of elements environmental to the present invention.

Certain problems have been encountered in the filled bag area of the bag production. One such problem has been that because the cross-sealing temperature is such as to initiate fusion, there is a tendency for sagging or stretch stress due to downward pull from the weight of the filled bag upon the cross-sealing at the upper edge of the filled bag. This is particularly true where fairly heavy loads are imposed by the bag contents. The top cross-seal of this bag is especially vulnerable to stretch damage where the bag making material is equipped with extruded plastic profile reclosable zipper means, and during the cross-sealing there is of necessity fusion at the spot sealing of the substantially greater mass of the zipper profiles as compared to the cross-sectional mass of the bag making film itself.

Another problem has resided in that a flowable product contents within the filled bag, has caused, due to the rather flimsy nature of the bag body film, generally central downward sagging of the bag as a result of settling of the contents. Thereby, also, the vertical edges of the freshly filled bag pull inwardly, and this develops pleats and tucks in the bag body.

SUMMARY OF THE PRESENT INVENTION

It is to at least the alleviation of the foregoing problems that the present invention is directed.

To this end, there is provided by the present invention, in combination in a form, fill and seal package or bag making machine having a vertical forming and filling tube and means below the discharge end of the tube for cross-sealing a continuous tubularly shaped zipper profile equipped thermosealable bag making film and thereby thermosealing the top edge of a filled bag and a lower edge of the next succeeding bag, and pulling the film and bags downwardly a bag length distance and then releasing the filled bag to drop away from the next succeeding bag; means for supportingly manipulating the filled bag during cross-sealing to avoid bag contents weight induced stretch stress damage to its thermosealed top edge.

The invention also provides in combination in a form, fill and seal machine of the general type just described manipulation support for the filled bag for avoiding development of pleats and tucks in the body film of the bag.

Additionally, the present invention provides in a form, fill and seal machine of the general character described a means for redistribution of relatively flowable bag contents whereby to avoid settling of the contents centrally, but shifting the contents toward opposite sides of the bag.

According to the present invention, there is also provided a method of practicing the present invention with the several means outlined hereinabove.

BRIEF DESCRIPTION OF THE DRAWINGS

Other objects, features and advantages of the present invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a more or less schematic elevational view of a form, fill and seal machine embodying the present invention;

FIG. 2 is an enlarged fragmentary front elevational view of the machine of FIG. 1 and showing the cross-sealing jaws spread open;

FIG. 3 is a view similar to FIG. 2 but showing the cross-sealing jaws closed;

FIG. 4 is a view similar to FIG. 3 but showing a modification;

FIG. 5 is a fragmentary schematic illustration of a freshly filled bag during production;

FIG. 6 is a more or less schematic fragmentary view showing the filled bag engaged by a supporting, lifting and bag contents redistribution means of the present invention; and FIG. 7 is an elevational view showing a completed filled bag, demonstrating the advantageous results of the filled bag manipulations effected by the present invention.

DETAILED DESCRIPTION

As more or less schematically illustrated in FIG. 1, a vertical form, fill and seal machine, of the kind with which the present invention is useful, includes a vertical forming and filling tube 10 of conventional form having thereabout a conventional forming shoulder or collar 11 by which thermosealable bag making film 12, preferably carrying reclosable zipper profiles 14, is guided into tubular relation about the tube 10. Immediately below the forming collar 11, the zipper profile-carrying longitudinal margins of the film 12 are joined and the flange areas outwardly from the reclosably interlocked profiles 14 are sealed together by means of a conventional device 15 to provide a closed seam 17 along one edge of the bags 18 formed from the film 12. The opposite closed edge of each bag 18 is, in this instance, formed by a longitudinal fold in the material 12.

As close as practicable below the lower end of the tube 10, there is provided combination sealing, pull down and severing means 19 comprising a pair of cooperating complementary oppositely reciprocating bars or jaws 20 mounted slidably on guide means such as rods 21. The jaws 20 carry cross-sealing means 22 (FIGS. 2 and 3) for cross-sealing the upper edge of the filled bag 18 and simultaneously sealing the lower edge of the next succeeding bag. In addition, the jaws 20 carry, yieldably mounted on the upper sides of the jaws, cooperating pinch bars 23 for holding the bag making material in laterally extended condition as guided by means such as stretching fingers 24 at the lower end of the tube 10. The jaws 20 have associated therewith cutoff means 25 which may comprise a cutoff knife. During the cross sealing the ends of the zipper 14 on each of the bags 18 is spot sealed at 26 to reduce by fusion the greater mass of the zipper end portions than the thickness of the bag film and to effect hermetic closure of the end portion of the zipper and of the seam 17. The arrangement is such that in a cycle of operation, the jaws 20 are caused to function cyclically vertically in a pull down movement, exemplified by directional arrow 27 in FIG. 3, substantially coincident with sealing and cutoff cooperation as indicated by directional arrows 28, and an upward movement exemplified by directional arrow 29 in FIGS. 1 and 2 after the jaws 20 have separated as indicated by the directional arrows 30.

In the course of the cyclical operation of the jaws 20, the bag making material 12 is advanced one bag section in each cycle, wherein the lead bag 18 is filled to whatever extent desired with a flowable, generally particulate, product contents C. The lead bag is then sealed off from the next succeeding bag and the bag material advanced downwardly a bag section. At completion of the downward phase of the cycle, the jaws 20 open and the filled, sealed lead bag is severed from the continuous bag making stream and drops away as exemplified in FIG. 1.

As shown in FIGS. 1, 2 and 5, the weight of the contents C tends to sag centrally downwardly, causing the fairly flimsy bag body material to pull downwardly and laterally inwardly from opposite vertical edges, with resultant inwardly pulling of the vertical edges of the bag section indicated by the directional arrows 31 in FIG. 5, and pleats or tucks 32 tending to form in the distorted bag body. In order to avoid this problem, means F are provided cooperatively related to the jaws 20 and functioning for supportingly manipulating the filled bag 18 during the cross-sealing and avoiding sag-caused pleats and tucks in the bag body. At the same time, stretch stress or sagging damage to the freshly thermosealed top edge of the filled bag is avoided, and redistribution of the bag contents C is effected. In a best mode arrangement, the means F comprises a pair of cooperating supporting and upwardly thrusting fingers 33 which may be respectively carried by downwardly projecting arms 34 on the jaw members 20.

Desirably, the fingers 33 are of a downwardly arcuate shape, as best seen in FIGS. 1, 2, 3 and 6, and of a narrow width and located to cooperate with one another, when the jaws 20 enter into the sealing and cutoff relationship, to effect an upwardly supporting action on the central portion of the filled bag by a criss-cross side-by-side relationship of the fingers, as shown. The fingers are narrower than the bag, as shown in FIGS. 1, 3, 4 and 6. Through their uplifting function, as exemplified by the directional arrow 35 (FIG. 6), the fingers 33 not only relieve the downward pull of the filled bag on the freshly fused upper edge cross-seal, but also redistribute the contents C laterally toward the opposite vertical edges of the bag, as demonstrated by direction arrows 37, thus substantially eliminating the sag distortions of the free hanging bag. When the filled bag 18 is released from the production stream upon separating or opening of the jaws 20 and thereby separation of the lifting, supporting fingers 33, the bag contents will tend to even out in the finished bag 18, as indicated by directional arrows 38 in FIG. 7. This results in a substantially uniformly distributed contents bag in the bag, facilitating further handling such as packing for storage and transportation.

Where it may be desired to be able to modulate action of the filled bag lifting means, an arrangement such as depicted in FIG. 4 may be employed. This arrangement is similar to that already described and common reference numerals identify identical parts, except that the means cooperatively related to the jaws 20 and functioning for supporting the filled bag 18 during the cross-sealing, for avoiding stretch stress damage to the fresh thermosealed top edge, as well as for avoiding persistence of the pleats and tucks in the bag body, and also for redistributing the bag contents, comprises an oscillating or swinging lever finger 39. An arm 40 depending from one of the jaws 20 rockably supports the finger 39 on a pivot or axle 41 so that a longer portion of the finger is movable into bag supporting relation, while a shorter, heel portion 42 of the finger is adapted to have pivotally attached thereto an operating linkage comprising a piston rod 43 projecting from a fluid operated actuator 44 pivotally secured to the lower side of the same jaw 20 as that to which the arm 40 is attached. Through this arrangement, the actuator 40 may be operated pneumatically by a controlled source of air through a supply duct 45 to swing the finger 39 between a released position as shown in dot-dash outline and a bag bottom engaging and supporting position as shown in full outline. In the latter position the function of the finger 39 will be substantially similar to the function of the fingers 33 in the first described form of the invention. To facilitate its function, the finger 39 is preferably of an upwardly curved form as shown. It will be understood that the actuator 44 will be operated in cooperative coordination with the operation of the sealing and pull down jaws 20.

An advantage of the oscillatable finger 39 is that because it is independently movable as well as movable with the jaw in which it is supported, the finger 39 can be through the actuator 44 provided with variable lift motion control.

It will be understood that variations and modifications may be effected without departing from the spirit and scope of the novel concepts of the present invention.

I claim as my invention:

1. In combination in a form, fill and seal package or bag making machine having a vertical forming and filling tube, and means below the discharge end of said tube for cross-sealing a continuous tubularly shaped zipper profile equipped thermosealable bag making form for thermosealing the top edge of a filled bag and the lower edge of the next succeeding bag, and pulling the film and bags downwardly a bag length distance and then releasing the bag filled bag to drop away from the next succeeding bag:

a finger means located in a bag supporting position beneath the bag and avoiding bag contents weight induced stretch stress damage to its thermosealed top edge, and to avoid by the supporting of the filled bag of bag contents weight caused pleats and tucks in the bag body film, said finger means being narrower than the bag to redistribute the filled bag contents and avoid central sagging of the filled bag; said cross-sealing and pull down means comprising a pair of cooperating reciprocating jaws, and said finger means comprising multiple fingers carried by said jaws and cooperatingly actuated by the reciprocating jaws.

2. A combination according to claim 1, wherein said fingers are rigidly attached to said jaws.

3. In combination in a form, fill and seal package or bag making machine having a vertical forming and filling tube and means below the discharge end of said tube for cross-sealing a continuous tubularly shaped zipper profile equipped thermosealable bag making film for thermosealing the top edge of a filled bag and the lower edge of the next succeeding bag, and pulling the film and bags downwardly a bag length distance and then releasing the filled bags to drop away from the next succeeding bag:

opposed fingers movable beneath the bag for supportingly manipulating the filled bag during cross-sealing to avoid bag contents weight induced stretched stress damage to its thermosealed top edge;

including cross-sealing and pull down means having a pair of cooperating jaws, and said fingers being carried by said jaws.

4. A combination according to claim 3, wherein said fingers are rigidly attached to said jaws.

* * * * *